Sept. 22, 1970 A. H. M. VAN DE SCHOOT ET AL 3,529,349

METHOD OF MANUFACTURING MULTIPLE MAGNETIC HEADS

Original Filed Oct. 7, 1964

INVENTORS
A.H.M. VAN DE SCHOOT
M.H.M. VROLIJKS
H.P. PELOSCHEK

BY

AGENT

United States Patent Office 3,529,349

Patented Sept. 22, 1970

3,529,349

METHOD OF MANUFACTURING MULTIPLE MAGNETIC HEADS

Adrianus Henricus Maria van de Schoot, Matthijs Henricus Maria Vrolijks, and Hans Peter Peloschek, Eindhoven, Netherlands, assignors, by mesne assignments, to U.S. Philips Corporation, New York, N.Y., a corporation of Delaware Original application Oct. 7, 1964, Ser. No. 402,231, now abandoned. This application Jan. 30, 1968, Ser. No. 760,740

Claims priority, application Netherlands, Oct. 9, 1963, 299,035

Int. Cl. H01f *7/00*

U.S. Cl. 29—603 4 Claims

ABSTRACT OF THE DISCLOSURE

A method of forming a multiple head employing a coating of layers of pulverulent enamel suspension on component plates of the head shield for subsequent bonding by heat treatment. The suspension preferably contains material corresponding to the plate coated.

Figure 1:
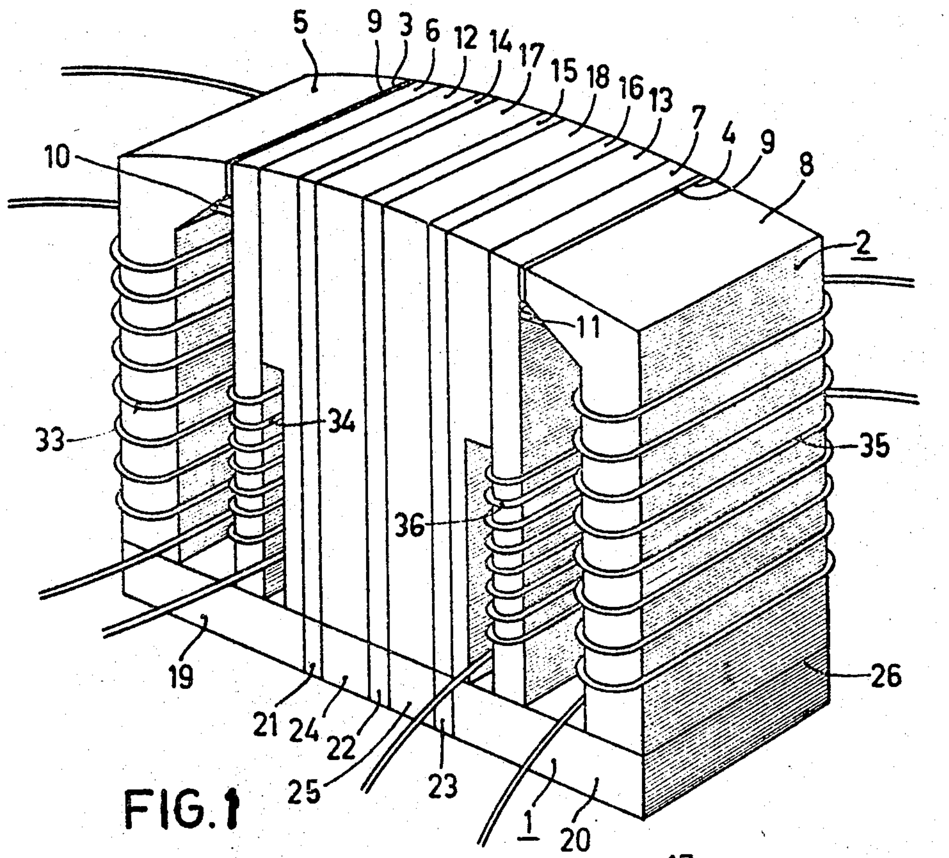

This is a division of application, Ser. No. 402,231, filed Oct. 7, 1964, now abandoned.

This invention relates to magnetic recording and reproducing apparatus adapted to record a signal on a magnetic record carrier and subsequently to reproduce (read) said signal.

More particularly, the invention pertains to multiple magnetic heads used for recording, reproducing and/or erasing on one track or a plurality of parallel tracks of a magnetic record carrier. In a more specific aspect, it relates to such heads composed of at least two core parts which are joined together; one of the core parts, termed the closure piece, completes the magnetic circuits for the other part, called the frontal piece, the latter being generally provided with the signal windings. The frontal piece includes at least two useful gaps having centers which are located on a line parallel to the direction of movement of the carrier. The invention is further particularly directed to heads wherein the said core parts are composed of ferrite, the gaps being bounded by the ferrite and being filled with nonmagnetic material serving to bond the bounding ferrite portions together. One of the two gaps may be used for recording, and the other may be used for reproducing the signals recorded by the first, if the same portion of the record carrier is led successively past both gaps.

In the prior art, one method of recording and then reading the recorded signal, has been to use *the same head* alternately as a recording and reading head. This has the disadvantage that a considerable length of time elapses between recording and reading and the required portion of record carrier is thus great. In addition, it is not possible to have different configurations of the recording and reading heads, if this is desired.

As an alternative, *two different heads* may be used. This method obviates the disadvantages mentioned above with respect to the use of the same head. It is evident, however, that it is very difficult when using two different heads to place the heads in exactly the same relative positions with respect to the magnetic carrier, which would be necessary for the reading head to faithfully reproduce the signal recorded in a track by a recording head.

Another method consists in the use of a *combined recording and reading head* (called a multiple head), but this in turn involves a disadvantage in that the magnetic field produced in the recording gap, which extends beyond the gap both inside and outside the core material of the head, generally is so extensive as to strongly influence the field produced in the reading gap. This situation results in two signals being read: firstly, the signal originating from the record carrier and, secondly, the signal resulting from the magnetic field of the recording gap. This phenomenon is referred to as cross-talk and may be reduced by increasing the distance between the recording and reading gaps. However, the head then becomes less compact and this is very disadvantageous when several such heads are used. In addition, if the distance between the gaps is increased, the length of time elapsing between recording and reading is likewise increased.

Among the objects of the invention are the following:

To provide a multiple magnetic head for recording and reproducing signals wherein the head is extremely compact and cross-talk is kept to a very low level;

To provide a multiple magnetic head wherein the distance between the recording and reading gaps is made very small without adversely affecting the operating characteristics of the head; and To provide a method of manufacturing a multiple magnetic head composed of a plurality of magnetic and nonmagnetic units wherein said units may be easily and effectively made into a rigid assembly.

Briefly, in accordance with one aspect of the invention, a multiple magnetic head of the above type (including a frontal piece and a closure piece) includes one or more plates of a material having good electrical conductivity extending between two parallel gaps through the entire frontal piece from one surface thereof to the other surface which is adapted to co-act with a magnetic record carrier.

According to another aspect of the invention, one or more plates composed of material of good electrical conductivity are also located in the core part forming the closure piece, these plates being aligned with the corresponding plates in the frontal piece. This feature results in a greater reduction in the cross-talk than the case where the closure piece is composed entirely of ferrite.

In another embodiment of the invention the portions of the frontal piece containing the gaps and the conductive plates are separated by plates of nonmagnetic ferrite while the conductive plates are separated by plates of ordinary magnetizable material, with all these bodies and plates being rigidly connected together. This gives the advantage of an increased mechanical rigidity to the head, which is especially advantageous when a plurality of parallel tracks are recorded, reproduced and/or erased and use is made of a unit comprising a plurality of juxtaposed head portions. The plates and the other portions may be rigidly connected together with the use of a layer of melting enamel, the melting point of the conductive plates being higher than 800° C. and the plates not being oxidized at this temperature. The enamel satisfactorily adheres to the material used for the head and may also be expanded evenly over the surfaces to be joined. Since the enamel is fluid at a temperature of approximately 800° C. the melting point of the conductive plates should be greater than 800° C. According to a preferred aspect of the invention, the material of good electric conductivity is silver. Silver satisfies the above-mentioned requirements and also adheres readily to the sintered oxidic material.

The invention also includes a method of manufacturing a rigid multiple head from the constitutive magnetic, nonmagnetic and conductive parts. According to this method, the plates and ferrite parts, prior to assembly, are individually smeared or sprayed with a pulverulent enamel suspension, which is dried after application, after which the said plates and parts are individually heated to a temperature higher than the melting temperature of the enamel and are then cooled down. This provides the said plates and parts with a thin layer of glaze thus making them suitable for further treatment.

The conductive plates (preferably silver) are covered with a pulverulent enamel suspension in which a material similar to that constituting the plates in the powdery state has been ssupended, after which the plates are individually heated to a temperature above the melting temperature of said suspension and then cooled down. The described composition of the suspension affords the advantage that the plates are wetted very uniformly.

The total assembly from which the multiple magnetic head is finally manufactured is obtained by covering the glazed parts of ferrite material once more with a thin layer of enamel suspension, after which these parts, after the suspension applied thereto has been dried, together with the conductive plates, are assembled to form an assembly of the desired composition which is heated to approximately 750° C. under a low pressure and then compressed under a higher pressure until the enamel layers have acquired a sufficiently small desired thickness, followed by cooling down of the assembly under a pressure which may be lower if desired. This method simplifies the task of giving the adhering enamel layers the desired thickness.

Figure 2:
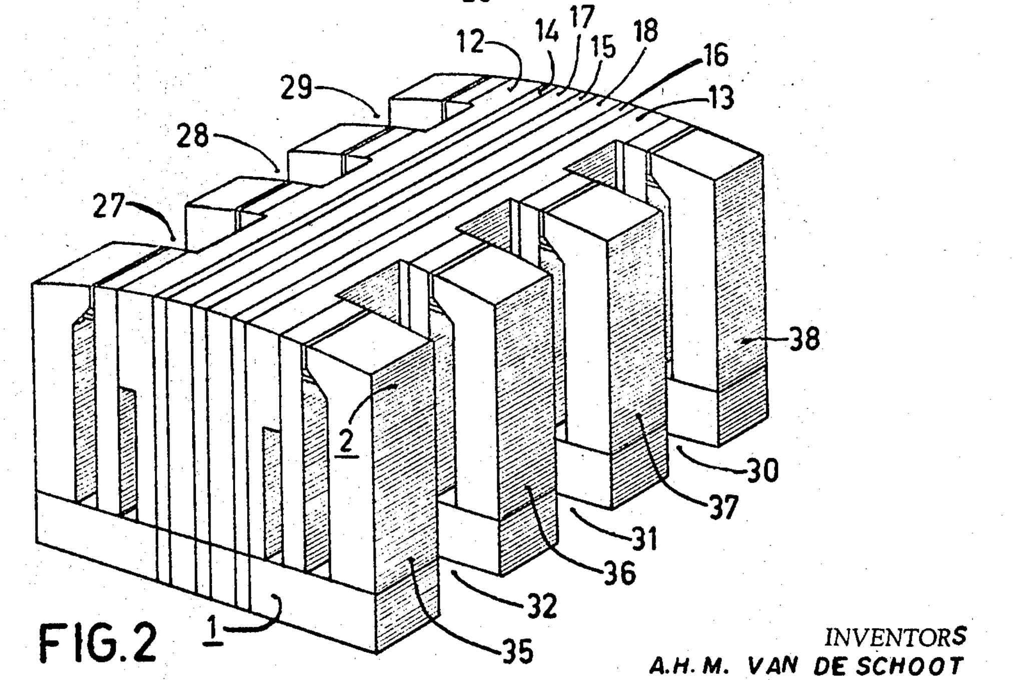

In order that the invention may be readily carried into effect, it will now be decribed in detail, by way of example, with reference to one embodiment thereof shown in the accompanying drawing, wherein:

FIG. 1 is an isometric side view of a multiple magnetic head according to the invention, adapted for coaction with one track of a magnetic record carrier; and FIG. 2 is an isometric side view of a multiple magnetic head adapted for co-action with a plurality of parallel tracks of a magnetic record carrier.

Reference numeral 1 of FIG. 1 denotes generally a closure piece and reference numeral 2 denotes generally a frontal piece.These may be referred to as core parts.

The frontal piece 2 includes two useful gaps 3 and 4, each bounded by two portions 5, 6 and 7, 8 respectively of magnetic ferrite material and each filled with nonmagnetic material 9, which is preferably enamel or glass, and may be drawn into the gaps by capillary action, for example. The parts 5, 6 and 7, 8 respectively are bonded together by the gap filling material; rods 10 and 11 of nonmagnetic ferrite materials may be provided under the gaps to serve for strengthening. Windings 33 to 36 are shown and material may be removed from the parts 5, 8 and the plates 12, 13 in any suitable mannner (for example, by grinding) in order to accommodate the required windings.

The portions 5, 6 and 7, 8 each including one gap, are rigidly fastened together by two plates 12 and 13 composed of nonmagnetic ferrite and three highly conductive plates 14, 15 and 16 made of silver, the latter being separated by two plates 17 and 18 of magnetic ferrite. The order of position of the said plates between the bodies 5, 6 and 7, 8 is as illustrated. The closure piece 1 is comprised of two parts 19, 20 of magnetic ferrite between which are three shielding plates 21, 22 and 23, preferably of silver, which are separated by plates 24 and 25 of magnetic ferrite. The core part 1 is adhered to the core part at surface 26. This attachment may be effected with the aid of, for example, an epoxy resin, provided the attachment is such that the magnetic reluctance in a magnetic circuit of the bodies 5, 6 and 7, 8 is low with respect to that in the useful gaps 3 and 4.

One embodiment of the method according to the invention such as used in the manufacture of the magnetic head shown in FIG. 1 is the following:

The constituent parts composed of ferrite material, prior to assembling, are individually covered with a pulverulent enamel suspension which is dried after application. Then these parts are individually heated until the enamel starts melting; this is followed by cooling down. A thin layer of glass is thus obtained on all the surfaces treated.

The shielding plates (which, as noted above, are preferably of silver) are covered with a pulverulent enamel suspension in which material, similar to that of the plates, is suspended in powdery form. These plates are also individually heated to a temperature above the melting temperature of said suspension.

Next, the constituent parts composed of ferrite material are covered once more with a thin enamel suspension. After this fresh layer is dried, the said ferrite constituent parts, together with the conductive plates, are put together to form an assembly of the desired composition and this is heated to approximately 750° C. under a low pressure, approximately 1 kg./cm.$^2$ at which temperature the enamel melts. Subsequently the pressure is increased to approximately 10 kg./cm.$^2$ in order to give the enamel layer the thickness desired.

FIG. 2 is an isometric side view of a multi-track multiple head according to the invention adapted to co-act with a plurality of parallel tracks. The individual multiple head portions 35 to 38 are similar to that described with reference to FIG. 1, and are fastened together by the plates 12 and 13 composed of a nonmagnetic ferrite material, the conductive shielding plates 14, 15 and 16 and the plates 17, 18 of magnetic ferrite material, said plates now extending from one individual head portion into another.

The constituent portions of the closure piece 1 are in alignment with the corresponding portions 14, 15, 16, 17, 18 of closure piece 2 and extend throughout the width of the complete assembly.

To manufacture such a multi-track multiple head, a compact assembly comprising the core parts 1 and 2 is made of the desired composition of plates and parts and of the desired width. Such an assembly is manufactured in the manner described with reference to FIG. 1, the core parts 1 and 2 being adhered together as already described. The assembly may be regarded as one multiple magnetic head of great width. Next, the assembly is sawed in throughout its height along planes at right angles to the surfaces of the plates located at either side of the conductive plates in the bodies comprising the useful gaps. These saw-cuts 27 to 32 extend slightly nto the plates 12, 13 of nonmagnetic ferrite. Lastly, the surface of the assembly which contains the useful gaps is given the desired shape, which may be circular, and the gap height is given to the desired value, after which the resulting surface is polished in known manner, for example, with the aid of powdery diamond.

In a multiple head according to the invention it is often advantageous to make the gaps in the reading and recording portion of the heads of different length and/or width; this may be of advantage in the reproduction of the recordings. Further it may sometimes be advantageous if the two gaps are not parallel. These modifications will be evident to those skilled in the art.

A multiple magnetic head of the kind described and shown may be of a much smaller size than has been possible hitherto. The shielding action of the silver plates is such that the distance between the centers of the gaps 3 and 4 (the recording gap and the reproducing gap) may be reduced to, for example, approximately 7 mm. without the occurrence of troublesome cross-talk. This shielding action is obtained even if only one silver plate is present between the two magnetic circuits. It has been found, however, that a plurality of such plates considerably increases the effect and this is also the case if the shielding plates extend as far into the core part 2 as illustrated in FIG. 1 and FIG. 2.

Silver is preferably used for the shielding plates as the material of good electric conductivity since silver has both a melting point higher than 800° C., that is to say 960° C., and a very low resistivity, that is to say $1.49.10^{-6}$ ohm/cm. In addition, silver is not oxidized when heated to 800° C. while it readily adheres to the sintered oxidic material. However, other materials may also be used for this purpose such as, for example:

gold (melting point 1063° C. resistivity 2.04.10$^{-6}$ ohm/cm.)

platinum (melting point 1773° C. resistivity 10.6.10$^{-6}$ ohm/cm.)

and certain nonmagnetic metal alloys, for example, stainless steel, which are not corrosive at 800° C. However, as compared with these other materials, silver has the advantage that its resistivity is lower and that it is also less expensive.

The composition and the manfacture of the assembly from which single-track or multi-track magnetic heads are made is such that a mechanically rigid assembly is obtained.

The pulverulent enamel suspension forming, after heating, a thin layer of glaze on the individual bodies, parts and plates of ferrite and with which these elements are covered once more prior to assembling of the total assembly, has for example the following composition:

| | Percent by weight |
|---|---|
| $SiO_2$ | 16 |
| $B_2O_3$ | 14 |
| ZnO | 10 |
| PbO | 60 |

or for example:

| | Percent by weight |
|---|---|
| $B_2O_3$ | 18 |
| ZnO | 16 |
| PbO | 66 |

or for example:

| | Percent by weight |
|---|---|
| $SiO_2$ | 10 |
| $B_2O_3$ | 8 |
| ZnO | 16 |
| PbO | 66 |

Prior to forming of the total assembly, the shielding plates are covered with a pulverulent enamel suspension in which a material similar to that constituting the plates is suspended. If this material is silver, the suspension has for example the following composition:

| | Percent by weight |
|---|---|
| Ag | 93 |
| $B_2O_3$ | 7 |

The advantage of this suspension over a pulverulent enamel suspension in which no silver is suspended, is that uniform wetting of the plates is possible, resulting in satisfactory adhesion.

Since the forming of the assembly requires a thermal treatment up to 750° C., at which temperature the applied enamel layer melts, one of the factors determining the choice of a suitable material for the shielding plates is the melting point of this material, which must be higher than the melting temperature of the enamel.

The plates 12 and 13 of nonmagnetic ferrite arranged between the bodies containing the useful gaps 3 and 4 and the portion of the head which includes the shielding plates add to the mechanical rigidity; this is of especial advantage when making a multi-track head. The adhesion of the nonmagnetic ferrite to the magnetic ferrite of the bodies including the useful gaps is stronger due, inter alia, to the closeness of the coefficients of expansion over the relevant temperature range, than the adhesion between silver and nonmagnetc ferrite; thus, the saw-cuts 27 to 32 do not have a great detrimental effect on the mechani-strength of the completed multi-track head. In addition, the central portion of the entire head is strengthened by the inclusion of the nonmagnetic plates.

Obviously, many modifications and variations of the present invention are possible in the light of the above teachings. It is therefore to be understood that, within the scope of the appended claims, the invention may be practiced otherwise then as specifically described.

What we claim is:

1. A method of manufacturing a portion of a multiple magnetic head comprising: covering at least one magnetic ferrite plate and two non-magnetic ferrite plates with a pulverulent enamel suspension, drying said suspension, subsequently heating said plates to a temperature higher than the melting temperature of the enamel, cooling said plates to allow said enamel to solidify into a layer, covering said plates with a second pulverulent enamel suspension, drying said second suspension, arranging said nonmagnetic ferrite plates adjacent to two portions, respectively, of magnetic head portions containing useful gaps, placing said magnetic ferrite plate between said nonmagnetic ferrite plates, with their respective enamel layers in contact heating the resulting assembly under pressure until the enamel layers soften and a desired thickness of enamel layer is obtained, and cooling said assembly to allow said enamel layers to harden and bond said assembly together.

2. A method of manufacturing a multiple magnetic head comprising: covering at least one magnetic ferrite plate and two nonmagnetic ferrite plates with a pulverulent enamel suspension, drying said suspension, subsequently heating said plates to a temperature higher than the melting temperature of the enamel, thereafter cooling said plates, subsequently covering said plates with a second pulverulent enamel suspension, drying said second suspension, arranging said nonmagnetic ferrite plates between and adjacent to two portions, respectively, of magnetic head portions containing useful gaps, placing a first plurality of said magnetic ferrite plates between said nonmagnetic ferrite plates, placing a second plurality of said magnetic ferrite plates separated by a nonmagnetic plate between two portions of magnetic ferrite closure portion, heating the resulting assemblies under pressure until a desired thickness of enamel layer is obtained, and cooling said assemblies to allow said enamel layers to harden and bond said assemblies together, and joining said two assemblies so that each portion of a magnetic head assembly is juxtaposed to a portion of the closure piece assembly and the magnetic ferrite plates on the magnetic head assembly are aligned with the magnetic ferrite plates in the closure piece assembly.

3. A method of manufacturing a portion of a multiple magnetic head comprising: covering at least one magnetic ferrite plate and two nonmagnetic ferrite plates with a pulverulent enamel suspension, drying said suspension, heating said plates to a temperature higher than the melting temperature of the enamel, cooling said plates, covering said plates with a second pulverulent enamel suspension, drying said second suspension, covering at least one highly conductive plate with a pulverulent enamel suspension in which a material similar to that constituting said conductive plate has been suspended in the powdery state, heating said conductive plates to a temperature higher than the melting temperatue of said suspension, cooling said conductive plates, arranging said nonmagnetic ferrite plates adjacent to two portions, respectively, of magnetic head portions containing useful gaps, placing said magnetic ferrite plates and said conductive plates between said nonmagnetic ferrite plates such that a magnetic ferrite plate is located between two conductive plates, with their respective enamel layers in contact heating the resulting assembly under pressure until the enamel layers soften and a desired thickness of enamel layer is obtained, and cooling said assembly to allow said enamel layers to harden and bond said assembly together.

4. A method of manufacturing a multiple magnetic head comprising: covering at least one magnetic ferrite plate and two nonmagnetic ferrite plates with a pulverulent enamel suspension, drying said suspension after said covering, heating said plates to a temperature higher than the melting temperature of the enamel, cooling said plates, subsequently covering said plates with a second pulverulent enamel suspension, drying said second suspension, covering a plurality of highly conductive plates with a pulverulent enamel suspension in which a material similar to that constituting said conductive plate has been suspended in the powdery state, heating said conductive plates to a temperature higher than the melting temperature of said suspension, cooling said conductive plates, arranging said nonmagnetic ferrite plates between and adjacent to two portions, respectively, of magnetic head portions containing useful gaps, placing a first plurality of said magnetic ferrite plates and a first plurality of said conductive plates between said nonmagnetic ferrite plates such that a magnetic ferrite plate is located between two conductive plates, placing a second plurality of said magnetic ferrite plates and a second plurality of said conductive plates between two portions of closure tween two conductive plates, heating the resulting assemportions such that a magnetic ferrite plate is located between two conductive plates, heating the resulting assemblies under pressure until a desired thickness of enamel layer is obtained, and cooling the assemblies to allow said enamel layers to harden and bond said assemblies together, and joining said two assemblies so that each portion of the magnetic head assembly is juxtaposed to a portion of the closure piece assembly and the magnetic ferrite plates and conductive plates on the magnetic head assembly are aligned with the magnetic ferrite plates and conductive plates, respectively, in the closure piece assembly.

References Cited

UNITED STATES PATENTS

| | | | |
|---|---|---|---|
| 2,922,231 | 1/1960 | Witt et al. | 179—100.2 X |
| 3,024,318 | 3/1962 | Duinker et al. | 179—100.2 |
| 3,064,333 | 11/1962 | Kristiansen et al. | 29—603 |
| 3,238,603 | 3/1966 | Curtis et al. | 29—603 |
| 3,252,153 | 5/1966 | Mos | 340—174.1 |

JOHN F. CAMPBELL, Primary Examiner

C. E. HALL, Assistant Examiner

U.S. Cl. X.R.

65—43, 59; 179—100.2

PO-1050
(5/69)

UNITED STATES PATENT OFFICE
CERTIFICATE OF CORRECTION

Patent No. 3,529,349 Dated September 22, 1970

Inventor(s) A.H.M. Van de Schoot et al

It is certified that error appears in the above-identified patent and that said Letters Patent are hereby corrected as shown below:

Col. 3, line 64, after "reluctance" insert --in situ--

Col. 4, line 44, "nto" should be --into--

Col. 4, line 75, ". In" should be --; in--

IN THE CLAIMS

Claim 4, line 24, cancel in its entirety.

Signed and sealed this 1st day of August 1972.

(SEAL)
Attest:

EDWARD M.FLETCHER,JR.
Attesting Officer

ROBERT GOTTSCHALK
Commissioner of Patents